United States Patent [19]

Fung

[11] Patent Number: 5,082,684
[45] Date of Patent: Jan. 21, 1992

[54] LOW-CALORIE FAT SUBSTITUTE

[75] Inventor: Fu-Ning Fung, Salem, Conn.

[73] Assignee: Pfizer Inc., New York, N.Y.

[21] Appl. No.: 475,576

[22] Filed: Feb. 5, 1990

[51] Int. Cl.⁵ .......................... A23D 7/00; A23D 7/02
[52] U.S. Cl. .................... 426/602; 426/603; 426/613; 426/566; 426/804
[58] Field of Search ............... 426/601, 602, 603, 613, 426/804, 566

[56] References Cited

U.S. PATENT DOCUMENTS

| | | | |
|---|---|---|---|
| 3,726,900 | 4/1973 | Schuppner | 99/139 |
| 3,843,828 | 10/1974 | Anndt | 426/360 |
| 4,031,061 | 6/1977 | Durst | 426/565 |
| 4,238,520 | 12/1980 | Miller | 426/573 |
| 4,284,655 | 8/1981 | Miller | 426/602 |
| 4,305,964 | 12/1981 | Moran | 426/99 |
| 4,305,970 | 12/1981 | Moran | 426/603 |
| 4,307,125 | 12/1981 | Amer | 426/604 |
| 4,362,780 | 12/1983 | MacNeill | 426/603 |
| 4,389,426 | 6/1983 | Edelman | 426/662 |
| 4,414,236 | 11/1983 | Moran | 426/573 |
| 4,882,187 | 11/1989 | Izzo et al. | 426/603 |
| 4,883,681 | 11/1989 | Ernsting | 426/603 |
| 4,917,915 | 4/1990 | Cain et al. | 426/603 |
| 4,943,445 | 7/1990 | Norton et al. | 426/603 |

FOREIGN PATENT DOCUMENTS

| | | |
|---|---|---|
| 0265003 | 4/1981 | European Pat. Off. . |
| 203628 | 2/1986 | European Pat. Off. . |
| 0244008 | 4/1987 | European Pat. Off. . |
| 0257714 | 3/1988 | European Pat. Off. . |
| 0279498 | 8/1988 | European Pat. Off. . |
| 0279499 | 8/1988 | European Pat. Off. . |
| 142646 | 7/1980 | Fed. Rep. of Germany . |
| 52-079060 | 7/1977 | Japan . |
| 1005465 | 1/1989 | Japan . |
| 88/04525 | 6/1988 | PCT Int'l Appl. . |
| 2021140 | of 0000 | United Kingdom . |
| 1277772 | 6/1972 | United Kingdom . |
| 1564800 | 4/1980 | United Kingdom . |
| 2205849 | 6/1987 | United Kingdom . |

OTHER PUBLICATIONS 215027, 03/82, RD Derwent.

Primary Examiner—Jeanette Hunter
Attorney, Agent, or Firm—Peter C. Richardson; Paul H. Ginsburg; Robert F. Sheyka

[57] ABSTRACT

There is disclosed a low calorie fat substitute comprising a non-flowable aqueous phase and an oil phase, with the interaction between said aqueous and oil phases resulting in a pourable emulsion. Also disclosed are food compositions containing pourable and nonpourable emulsions.

65 Claims, No Drawings

LOW-CALORIE FAT SUBSTITUTE

BACKGROUND OF THE INVENTION

The present invention is directed to low calorie fat substitutes. More specifically, it is directed to an emulsion containing an oil phase and an aqueous phase which is useful as a low calorie fat substitute.

In today's health conscious society, there is a growing demand for low calorie foods. Excess body weight not only creates a feeling of low self confidence in social situations but also has been shown to contribute to the impairment of the cardiovascular function of the individual. Moreover, the reduction of the performance capacity of the individual is another consequence of excess body weight.

Many approaches have been suggested to control excess body weight. The use of chemical appetite suppressants and appetite inhibitors is a well known approach but these chemical agents are often unsafe for long term use and/or may have undesirable side effects. Moreover, they are usually available only through a physician's prescription.

Low calorie foods have also been widely advocated as a diet regimen to control excess body weight. Such low-calorie foods include low calorie spreads, which are typically water-in-oil emulsions; and low calorie sauces, such as salad dressings and mayonnaise which are typically oil-in-water emulsions.

Recently water-in-oil-in-water emulsions (w/o/w) have been described as additives for low calorie foods. Such w/o/w emulsions are described in U.S. Pat. Nos. 4,650,690, 4,632,840 and 4,590,086.

U.S. Patent No. 4,238,520 refers to a low fat comestible spread which is an oil-in-water emulsion containing about 20% to about 40% fat, a lipoidal emulsifier, and a water-soluble or dispersible thickening agent. The fat is chosen to impart a plastic-like consistency to the emulsion.

U.S. Pat. No. 4,284,655 refers to a flavored comestible spread which is an oil-in-water dispersion comprising water, a partial glyceride ester composition containing about 38–48% diglyceride or monoglyceride in the ratio of about 1:5 to 1:1.5 based on the diglyceride content, and triglyceride in an amount less than the mono and diglyceride contents combined.

U.S. Pat. No. 4,305,964 refers to food products comprising a continuous aqueous phase and a dispersed gelled aqueous phase.

European Patent Application No. 244,009 refers to a spread containing a heated dairy cream.

European Patent Application No. 257,714 refers to a multifunctional fat-continuous emulsion. The composition is a water-in-oil emulsion with a proteinaceous aqueous phase, wherein the emulsifier system comprises mono fatty acid esters of both saturated and unsaturated fatty acids with a polyhydroxy alcohol.

European Patent Application No. 265,003 refers to a water-in-oil emulsion which contains a thickened proteinaceous aqueous phase, a fatty phase, an emulsifier and a mixture of phosphatides.

European Patent Application No. 279,498 refers to a plastified dispersion with a continuous fat phase and a dispersed aqueous phase with the dispersed phase containing less than 0.1 % amino acid residues.

European Patent Application No. 279,499 refers to a plastified dispersion wherein the aqueous phase has a viscosity of less than 400 cps. at 35° C.

Great Britain Patent No. 1,564,800 refers to a low fat spread containing a gelled proteinaceous aqueous phase and a continuous fatty phase.

PCT application 88/04525 refers to a water in oil (w/o) emulsion which contains at least 25% crystallized fat.

U.S. Pat. No. 4,307,125 refers to a process for producing a low fat emulsion using a natural dairy cream and an emulsifier having a hydrophilic to lipophilic balance of about 3 to 5.

United Kingdom Patent application No. 2,021,140 refers to a dairy blend comprising butter and vegetable oil. United Kingdom Patent Application No. 1,277,772 refers to a fluid beverage comprising a mixture of whey solids and fat.

Great Britain Application No. 2,205,849 refers to a low fat spread containing an emulsifying agent, a continuous fatty phase and an aqueous phase containing protein, gelatin, starch and optionally hydrocolloids.

U.S. Pat. No. 3,726,690 refers to an acidified food containing fats, milk solids, an edible protein, an edible emulsifier and a Xanthomonas colloid.

U.S. Pat. No. 4,414,236 refers to an edible w/o emulsion with a gelled aqueous phase containing a medium melting point gelling agent, i.e. xanthans, carrageenans and locust bean gum.

U.S. Pat. No. 4,389,426 refers to a w/o emulsion with a gelled phase containing two hydrocolloids.

U.S. Pat. No. 4,362,758 refers to a process for making a low calorie food spread by producing an oil-in-water emulsion having 1% protein in the aqueous phase.

U.S. Pat. No. 4,305,970 refers to an edible fat spread of the water-in-oil emulsion type containing a continuous fatty phase, a dispersed liquid aqueous phase, and dispersed gelled aqueous ingredients.

U.S. Pat. No. 4,468,408 refers to a low-fat, butter-flavored oil in water liquid spread with a dispersed phase having 5 to 40 percent fat and a continuous phase comprising 65–92% water with stabilizers.

U.S. Pat. No. 4,031,261 refers to a hard-frozen beverage containing fat and a film-forming protein.

SUMMARY OF THE INVENTION

In one embodiment, the present invention is directed to a two-phase emulsion useful as a low calorie fat substitute comprising:

(a) from about 1 to about 95 percent of an aqueous phase rendered non-flowable by the addition of a suitable amount of a gel-forming composition; and (b) from about 5 to about 99 percent of an oil phase comprising a fat or oil and an emulsifier wherein the interaction between said non-flowable aqueous phase and said oil phase results in the two-phase emulsion being pourable.

Preferred is the emulsion containing from about 50 to about 85 percent of said aqueous phase and from about 15 to about 50 percent of said oil phase.

Preferred is the emulsion wherein the gel-forming composition is selected from the group consisting of agar, gelatin, pectins, and carrageenans.

Also preferred is the emulsion wherein said gel-forming composition is selected from the group consisting of alginates, xanthans, carrageenans, succinoglycans, and scleroglucans, cross-linked with an appropriate cross-linking agent.

Especially preferred is the emulsion wherein said gel-forming composition is carrageenan cross-linked with calcium or potassium salts; or combinations thereof.

Also preferred is the emulsion wherein said gel-forming composition is xanthan gum combined with locust bean gum or guar gum; and combinations therein.

Preferred is the composition wherein said gel-forming composition is present at a concentration of from about 0.1 to about 3.0 percent of the aqueous phase.

Preferred is the emulsion wherein the gel-forming composition is agar, and is present at a concentration of from about 0.3 to about 0.7 percent of the aqueous phase.

Also preferred is the emulsion wherein the gel-forming composition is alginate cross-linked with a calcium salt, with said cross-linked alginate being present at from about 0.5 to about 1.5 percent of the aqueous phase.

Especially preferred is the emulsion wherein said gel-forming composition is carrageenan, and is present at from about 0.7 to about 2.0 percent of the aqueous phase.

Also especially preferred is the emulsion wherein said gel-forming composition is carrageenan cross-linked with a potassium or calcium salt, with said crosslinked carrageenan being present at a concentration of from about 0.3 to about 1.5 percent of the aqueous phase.

Also especially preferred is the emulsion wherein said gel-forming composition is formed by addition of a suitable acidifying agent to a suitable amount of alginate.

Preferred emulsifiers are selected from the group consisting of lecithins, polyol fatty acid esters, monoglycerides, diglycerides, diacetyltartaric acid esters of mono- and diglycerides, monosodium phosphate derivatives of mono- and diglycerides, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, citric, acetic, and succinic with mono- and diglycerides, esters of acids selected from the group consisting of fumaric, lactic, tartaric, and citric with fatty acids or fatty alcohols; and combinations thereof.

Especially preferred emulsifiers are mono- and diglycerides; and combinations thereof.

Preferred fats or oils are selected from the group consisting of vegetable fats and oils, animal fats, anhydrous milkfat, hydrogenated vegetable oils, partially hydrogenated vegetable oils, partially hydrogenated palm kernel oil; and combinations thereof.

Especially preferred fats or oils are partially hydrogenated palm kernel oil, partially hydrogenated vegetable oils, and anhydrous milkfat; and combinations thereof.

Also preferred is the emulsion further comprising the addition of a suitable pH adjusting agent with preferred pH adjusting agents being selected from acids selected from the group consisting of phosphoric, acetic, lactic, malic, adipic, fumaric, tartaric, citric, hydrochloric and sulfuric acids; salts thereof; glucono delta lactone; and combinations thereof.

In another embodiment, the present invention is directed to a process for preparing an emulsion comprising:

(a) mixing an aqueous medium, a gel-forming composition, a fat or oil, and an appropriate emulsifier;

(b) stirring at a temperature and shear rate sufficient to produce an emulsion or disperson of the fat or oil with the aqueous medium; and (c) stirring as said emulsion or dispersion is cooled to a temperature of from about 5° C. to about 30° C.

Preferred is the process wherein the gel-forming composition is selected from the group consisting of agar, pectins, and carrageenans.

Also preferred is the process wherein said gel-forming composition is selected from the group consisting of alginates or carrageenans, cross-linked with an appropriate cross-linking agent.

Especially preferred is the process wherein said gel-forming composition is alginate cross-linked with a calcium salt.

Also especially preferred is the process wherein said gel-forming composition is carrageenan cross-linked with calcium or potassium salts, or combinations thereof.

Also preferred is the process wherein said gel-forming composition is xanthan gum combined with locust bean gum or guar gum; or combinations thereof.

Preferred is the process wherein said gel-forming composition is present at from about 0.1 to about 3.0 percent of the aqueous phase.

Preferred is the process wherein the gel-forming composition is agar and is present at from about 0.3 to about 0.7 percent of the aqueous phase.

Also preferred is the process wherein the gel-forming composition is alginate cross-linked with a calcium salt, with said cross-linked alginate being present at from about 0.5 to about 1.5 percent of the aqueous phase.

Especially preferred is the process wherein said gel-forming composition is carrageenan, and is present at from about 0.7 to about 2.0 percent of the aqueous phase.

Also especially preferred is the process wherein said gel-forming composition is carrageenan cross-linked with a potassium or calcium salt with said cross-linked carrageenan being present at from about 0.3 to about 1.5 percent of the aqueous phase.

Preferred emulsifiers are selected from the group consisting of lecithins, polyol fatty acid esters, monoglycerides, diglycerides, diacetyltartaric acid esters of mono- and diglycerides, monosodium phosphate derivatives of mono- and diglycerides, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, citric, acetic or succinic with mono- and diglycerides, esters of acids selected from the group consisting of fumaric, lactic, tartaric, or citric acid with fatty acids or fatty alcohols; and combinations thereof.

Especially preferred emulsifiers are mono- and diglycerides, and combinations thereof.

Preferred fats or oils are selected from the group consisting of vegetable fats and oils, animal fats, anhydrous milkfat, hydrogenated vegetable oils, partially hydrogenated vegetable oil, or partially hydrogenated palm kernel oil; and combinations thereof.

Especially preferred fats or oils are partially hydrogenated palm kernel oil, partially hydrogenated vegetable oils, and anhydrous milkfat; and combinations thereof.

Also preferred is the process further comprising the addition of a suitable pH adjusting agent, with preferred pH adjusting agents being selected from the group consisting of acids selected from the group consisting of phosphoric, acetic, lactic, malic, adipic, fumaric, tartaric, citric, hydrochloric and sulfuric; salts thereof; glucono delta lactone; and combinations thereof.

The present invention is also directed to a foodstuff having at least a portion of the normally present triglyceride replaced by an emulsion of the present invention.

Preferred foods into which the emulsion of the present invention may be incorporated are frozen desserts, salad dressings, dips for chips, crackers or vegetables, spreads, confections, whipped toppings, frostings or icings for cakes or cookies, fillings for cakes or cookies, whipped or gelled desserts, puddings, beverages, baked goods, and soups.

In yet another embodiment, the present invention is directed to a method of reducing the fat content of a food containing triglycerides comprising replacing at least a portion of the normally present triglyceride with the pourable emulsion of the present invention.

In still another preferred embodiment, the present invention is directed to a method of reducing the fat content of a food containing triglycerides comprising replacing at least a portion of the normally present triglyceride with a two-phase emulsion comprising:

(a) from about 1 to about 95 percent of an aqueous phase rendered non-flowable by the addition of a suitable amount of a gel-forming composition; and (b) from about 5 to about 99 percent of an oil phase comprising a fat or oil and an emulsifier; said emulsion processed to render said emulsion nonpourable.

Also forming a part of the present invention are foodstuffs having at least a portion of the normally present triglyceride replaced by a two-phase emulsion comprising:

(a) from about 1 to about 95 percent of an aqueous phase rendered non-flowable by the addition of a suitable amount of a gel-forming composition; and (b) from about 5 to about 99 percent of an oil phase comprising a fat or oil and an emulsifier; said emulsion processed to render said emulsion nonpourable.

Preferred foods into which the nonpourable emulsion may be incorporated are frozen desserts, salad dressings, dips for chips, crackers or vegetables, spreads, confections, whipped toppings, frostings or icings for cakes or cookies, fillings for cakes or cookies, whipped or gelled desserts, puddings, beverages, baked goods, and soups.

DETAILED DESCRIPTION OF THE INVENTION

The aqueous gel-forming compositions used in the present invention are formed by dissolving a gel-forming composition in an aqueous medium. Examples of gel-forming compositions are agar, carrageenans, gelatin, and pectins. The amount of the gel-forming composition to be dissolved in the aqueous medium to form the aqueous gel-forming composition is readily determined by a person of ordinary skill in the art.

Preferred also is the aqueous gel-forming composition formed by combining, in an aqueous medium, a gel-forming amount of an appropriate polysaccharide with a salt of a metal cation capable of cross-linking said polysaccharide. Preferred metal cations are food grade metal cations. Preferred aqueous gel-forming compositions are those wherein the gel-forming polysaccharide is selected from the group consisting of alginates, succinoglycans, carrageenans, xanthans, and scleroglucans, and the metal cation is calcium (II) or magnesium (II). Another preferred aqueous gel-forming composition is that wherein the gel-forming polysaccharide is carrageenan and the metal cation is calcium (II) or potassium (I). Another preferred gel-forming composition is formed by combining a xanthan with locust bean gum or guar gum.

The gel-forming composition is present, based on the weight of the aqueous phase, at from about 0.1 to about 3.0 percent of the aqueous phase. As is well known to one skilled in the art, the amount of gel-forming composition necessary to render the aqueous phase non-flowable depends on the nature of the gel-forming composition. Thus, the above ranges are subject to variations depending on the gel-forming composition used. For instance, if agar is used, it will be present in the aqueous phase at a concentration of from about 0.3 to about 0.7 percent. If carrageenan is used, it will be present in the aqueous phase at a concentration of from about 0.7 to about 2.0 percent. If cross-linked carrageenan is used, it will be present in the aqueous phase at a concentration of from about 0.3 to about 1.5 percent. If cross-linked alginate is used, it will be present in the aqueous phase at a concentration of from about 0.5 to about 1.5 percent.

Another suitable gel-forming composition is formed by adding an acidifying agent to an alginate. Suitable acidifying agents include acids such as hydrochloric, acetic, citric, phosphoric, fumaric, tartaric and succinic acid.

The emulsion also contains an emulsifier. Preferred commercially available emulsifiers are lecithins, mono- and diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, and citric acid with fatty acids or fatty alcohols, esters of acids selected from the group consisting of of fumaric, lactic, tartaric, citric, acetic and succinic with mono- or diglycerides; and combinations thereof.

The oil phase of the emulsion also contains, based on the weight of the total emulsion, from about 5 to about 99 percent, preferably from about 15 to about 50 percent, of an edible fat or oil. Suitable fats and oils include animal fats, vegetable fats and oils, anhydrous milkfat, hydrogenated vegetable oils, partially hydrogenated vegetable oils, partially hydrogenated palm kernel oils; and combinations thereof.

The pH of the emulsion may, if desired, be controlled by addition of one or more pH adjusting agents. Suitable pH adjusting agents are added at a concentration of from about 0.1 to about 3.0 percent, preferably 0.1–1.0 percent, based on the weight of the emulsion. Examples of pH adjusting agents are fumaric, hydrochloric, sulfuric, phosphoric, acetic, lactic, adipic, malic, tartaric or citric acid; salts thereof; glucono delta lactone; and combinations thereof.

The emulsion of the present invention contains an aqueous phase which is rendered non-flowable by the addition of a gel-forming composition. By "non-flowable" is meant that if the aqueous phase were made up separately, apart from the emulsion, it would not flow or conform to its container in the manner of a liquid. Although the aqueous phase is non-flowable, the interaction between the aqueous phase and the oil phase results in the emulsion being pourable. By "pourable" is meant that the emulsion retains substantially liquid characteristics, and can easily be transferred from one container to another by pouring.

For incorporation of either the pourable or the nonpourable emulsion of the present invention into a foodstuff which does not contain a large amount of water, it may be desirable to add a water-binding composition to the emulsion to decrease the water activity of the aqueous phase. This serves to decrease osmotic effects, whereby water is lost from the emulsion to other components of the foodstuff, thus possibly destabilizing the emulsion. As is well known to those skilled in the art, decreasing the water activity of the aqueous phase can have the further beneficial effect of decreasing susceptibility of the emulsion to microbial growth.

As used herein the term "water-binding composition" is defined as a substance which, when combined with water, decreases the availability of the water for physical, chemical, or metabolic processes.

Non-limiting examples of such water-binding compositions include soluble carbohydrates (e.g. sucrose, polydextrose), insoluble carbohydrates (e.g. microcrystalline cellulose, micronized bran), polyols (e.g. sorbitol, glycerol), proteins (e.g. whey protein), inorganic salts (e.g. sodium chloride), carboxylic acids (e.g. citric aid), salts of carboxylic acids (e.g. sodium acetate); and combinations thereof.

Emulsions of the present invention are useful as fat substitutes, replacing at least a portion of the normally present triglycerides in a foodstuff. Some emulsions of the present invention can be substituted for triglycerides on a substantially equal weight basis. Other emulsions with lower water content, also within the scope of the present invention, are useful as concentrated fat substitutes. Because of their low water content, such emulsions can be shipped and stored economically, and have improved microbiological stability. During formulation of a food with a concentrated emulsion, water is added to the emulsion either before or during addition of other food ingredients.

Preferred foods into which the present emulsion may be incorporated are salad dressings, frozen desserts, soups, dips for chips, crackers or vegetables, mayonnaise, fillings for cakes and cookies, confections, cake frosting, whipped desserts, gelled desserts, beverages, puddings, and baked goods.

The emulsion of the present invention is prepared by mixing an aqueous medium, a gel-forming composition, a fat or oil, and an appropriate emulsifier, stirring at a temperature and shear rate sufficient to produce an emulsion, and then cooling the resultant emulsion. If the gel-forming composition includes a cross-linking agent or gelation promoter, this is preferably added to the stirred emulsion prior to cooling.

The same process can be used to prepare a nonpourable emulsion, also useful as a low-calorie fat substitute. While it is not intended that the scope of the invention be limited by any particular theory, the following observations appear to apply in most cases: (1) only fats which are solid or semisolid at room temperature give nonpourable emulsions. (2) Decreasing the plasticity of the fat increases emulsion viscosity. (3) Increasing the percentage of fat in the emulsion increases emulsion viscosity; emulsions containing more than about 50% of solid or semisolid fat are usually nonpourable. (4) Increasing gelant concentration increases emulsion viscosity. Further, it has been observed that either homogenization or an increase in emulsifier level usually, although not always, increases emulsion viscosity.

In either concentrated or non-concentrated form, the nonpourable emulsion of the present invention can be used to replace at least a portion of the normally present triglycerides in a foodstuff, and is useful in the same foods as the pourable emulsion. The nonpourable emulsion sometimes shows better functionality than the pourable emulsion in foods which are themselves highly viscous and have a high fat content, such as cookie fillings and certain frostings for cakes or cookies.

The invention having been described in general terms, reference is now made to specific examples. It is to be understood that these examples are not meant to limit the present invention, the scope of which is determined by the appended claims.

EXAMPLE 1

Pourable Emulsion

Agar Gel - Partially Hydrogenated Palm Kernel Oil

An agar solution was prepared by dissolving 5.0 grams of food-grade agar in 995 grams of distilled water with stirring and heating to 95° C. The agar solution was cooled to about 70° C. and added with stirring to a hot (70° C.) solution of 25 grams of Dur-Em 117 emulsifier (Durkee Industrial Foods Corp. mono- and diglycerides) in 500 grams of molten Satina 44 fat (Durkee Industrial Foods Corp. partially hydrogenated palm kernel oil). Stirring was continued for about 10 minutes while the mixture cooled to 25°-30° C. The resulting emulsion was stored in a refrigerator at approximately 5° C. for 24 hours prior to use.

EXAMPLE 2

Pourable Emulsion

Calcium Alginate - Anhydrous Milkfat

An alginate solution was prepared by dissolving 5.0 grams of Keltone HV sodium alginate (Kelco Division of Merck and Co., Inc.) in 495 grams of distilled water at room temperature. This solution was added slowly with stirring to a hot (55°-60° C.) solution of 8.3 grams of Dur-Em 117 emulsifier in 166.5 grams of molten anhydrous milkfat (Mid-America Farms). After about 5 minutes of stirring, 3.0 milliliters of a 5% solution of calcium chloride in distilled water was added. Stirring was continued for approximately 10 minutes. The resulting emulsion was stored in a refrigerator at approximately 5° C. for 34 hours prior to use.

EXAMPLE 3

Pourable Emulsion

Agar gel - Partially Hydrogenated

Soybean and Cottonseed Oil o An agar solution was prepared by dissolving 30.0 grams of food-grade agar in 2970 grams of distilled water with stirring and heating to 95° C. The agar solution was cooled to about 70° C. and added with stirring to a hot (70° C.) solution of 50 grams of Dur-Em 117 emulsifier (Durkee Industrial Foods Corp. mono- and diglycerides) in 1000 grams of molten Tem Cote IE fat (Bunge Foods partially hydrogenated soybean and cottonseed oil). Stirring was continued for about 10 minutes while the mixture cooled to 25°-30° C. The resulting emulsion was passed through a two-stage homogenizer (2500 pounds per square inch followed by 500 pounds per square inch), then stored in a refrigerator at approximately 5° C. for 24 hours prior to use.

EXAMPLE 4

Pourable Emulsion

Agar Gel - Partially Hydrogenated Soybean Oil

An agar solution was prepared by dissolving 30.0 grams of food-grade agar in 2970 grams of distilled water with stirring and heating to 95° C. The agar solution was cooled to about 70° C. and added with stirring to a hot (70° C.) solution of 50 grams of Dur-Em 117 emulsifier (Durkee Industrial Foods Corp. mono- and diglycerides) in 1000 grams of molten Tem Plus 95 fat (Bunge Foods partially hydrogenated soybean oil). Stirring was continued for about 10 minutes while the mixture cooled to 25°–30° C. The resulting emulsion was passed through a two-stage homogenizer (2500 pounds per square inch followed by 500 pounds per square inch), then stored in a refrigerator at approximately 5° C. for 24 hours prior to use.

EXAMPLE 5

Pourable Emulsion

Agar Gel - Partially Hydrogenated Soybean Oil

An agar solution was prepared by dissolving 4.0 grams of food-grade agar in 296 grams of distilled water with stirring and heating to 95° C. The agar solution was cooled to about 70° C. and added with stirring to a hot (70° C.) solution of 7.1 grams of Dur-Em 117 emulsifier (Durkee Industrial Foods Corp. mono- and diglycerides) in 142 grams of molten Tem Plus 95 fat (Bunge Foods partially hydrogenated soybean oil). Stirring was continued for about 10 minutes while the mixture cooled to 25°–30° C. The resulting emulsion was homogenized at about 1000 pounds per square inch, then stored in a refrigerator at approximately 5° C. for 24 hours prior to use.

EXAMPLE 6

Pourable Emulsion

Potassium Carrageenan Gel - Partially Hydrogenated Soybean and Cottonseed Oil

A carrageenan solution was prepared by dissolving 7.5 grams of Gelcarin DG 764B (Marine Colloids Division of FMC, carrageenan) in 1492 grams of distilled water with stirring at about 60° C. This was added slowly with stirring to a hot (55°–60° C.) solution of 25 grams of Dur-Em 117 emulsifier (Durkee Industrial Foods Corp. mono- and diglycerides) in 500 grams of molten Tem Cote IE fat (Bunge Foods partially hydrogenated soybean and cottonseed oil). Stirring was continued for about 10 minutes while the mixture cooled to 25°–30° C. The resulting emulsion was homogenized at about 1000 pounds per square inch, then stored in a refrigerator at approximately 5° C. for 24 hours prior to use.

EXAMPLE 7

Pourable Emulsion

Agar Gel - Anhydrous Milkfat

An agar solution was prepared by dissolving 2.5 grams of food-grade agar in 498 grams of distilled water with stirring and heating to 95° C. The agar solution was cooled to about 70° C. and added with stirring to a hot (55°–60° C.) solution of 8.3 grams of Dur-Em 117 emulsifier (Durkee Industrial Foods Corp. mono- and diglycerides) in 166.5 grams of molten anhydrous milkfat (Mid-America Farms). Stirring was continued for about 10 minutes while the mixture cooled to 30° C. The resulting emulsion was stored in a refrigerator at approximately 5° C. for 24 hours prior to use.

EXAMPLE 8

| Creamy French Dressing | |
|---|---|
| Ingredients | Weight percent |
| Fat-gel emulsion prepared according to Example 1 | 46.48 |
| Distilled water | 37.55 |
| Vinegar | 9.47 |
| Sucrose | 2.00 |
| M100 maltodextrin (Grain Processing Corp.) | 1.70 |
| Salt | 1.00 |
| Xanthan Gum | 0.35 |
| Propylene glycol alginate | 0.16 |
| Polysorbate 60 | 0.10 |
| Lemon juice | 0.10 |
| Sodium Benzoate | 0.10 |
| Potassium sorbate | 0.10 |
| Spices | 0.77 |
| Flavors | 0.12 |
| Total | 100.00 |

The water, vinegar, sucrose, maltodextrin, salt, polysorbate 60, lemon juice, sodium benzoate, and potassium sorbate were mixed, and to the mixture, the xanthan gum and propylene glycol alginate were slowly added with stirring. Stirring was continued for about 5 minutes, the spices and flavors were added, stirring was continued for about 5 minutes, the fat-gel emulsion was slowly added with stirring, and stirring was continued for about 2 minutes. The mixture was homogenized at a pressure of 500°–1000 pounds per square inch. The resulting dressing, containing 15% fat, was judged by a taste panel to be equivalent in overall organoleptic quality to a control, containing 46% fat, made the same way but with an equal weight of corn oil substituted for the fat-gel emulsion.

EXAMPLE 9

| Frozen Dessert | |
|---|---|
| Ingredients | Weight percent |
| Fat-gel emulsion prepared according to Example 2 | 12.0 |
| Sucrose | 15.0 |
| Powdered skim milk | 11.0 |
| Vanilla extract | 1.0 |
| Dricoid 200 (emulsifier-stabilizer manufactured by Kelco Division of Merck and Co., containing mono and diglycerides, guar gum, xanthan gum, carrageenan, and citric acid) | 0.2 |
| Water | 60.8 |
| Total | 100.0 |

The water was preheated to 70° C. and transferred to a kitchen blender. With the blender running at medium speed, the Dricoid 200 was added, followed by the powdered skim milk and sucrose. Blending was continued for 2 minutes. The fat-gel emulsion was added with blending, and blending was continued for 5 minutes. The resulting mixture was pasteurized by heating to 70° C. for 30 minutes, homogenized at 2500 pounds per square inch, homogenized again at 500 pounds per square inch, and stored under refrigeration overnight. The vanilla extract was added with stirring, and the mixture was frozen with a small commercial ice cream freezer (Taylor Model 103). The resulting low-fat ice cream, containing 3% fat, was judged by a taste panel to be equivalent in overall organoleptic quality to a standard ice cream containing 12% fat.

EXAMPLE 10

| Mayonnaise | |
|---|---|
| Ingredients | Weight percent |
| Fat-gel emulsion prepared according to Example 3 | 78.59 |
| Whole eggs | 7.60 |
| Egg yolks | 3.50 |
| Lemon Juice | 3.00 |
| Vinegar | 2.90 |
| Water | 2.50 |
| Salt | 0.75 |
| Xanthan | 0.70 |
| Mustard powder | 0.30 |
| Onion powder | 0.08 |
| White pepper | 0.04 |
| Garlic powder | 0.04 |
| Total | 100.00 |

The whole eggs, egg yolks, lemon juice, vinegar, salt, spices, and one tenth of the fat-gel emulsion were mixed in a blender at low speed for one minute. In a separate vessel, the xanthan was added to the water and allowed to stand until hydrated. This mixture was added to the blender during one minute; blending speed was increased as required to maintain a vortex. The remaining fat-gel emulsion was then added during one minute while blending at low speed. The resulting mayonnaise, containing 21.5% fat, was found acceptable when compared organoleptically with a control mayonnaise containing 80.5% fat.

EXAMPLE 11

Mayonnaise

Example 10 was repeated, except that a fat-gel emulsion prepared according to Example 4 was substituted for the emulsion used in Example 10. The resulting mayonnaise, containing 21.5% fat, was found acceptable when compared organoleptically with a control mayonnaise containing 80.5% fat.

EXAMPLE 12

| Frosting | |
|---|---|
| Ingredients | Weight percent |
| 10x powdered sugar | 75.28 |
| Fat-gel emulsion prepared according to Example 5 | 15.75 |
| Heavy cream | 4.75 |
| M100 maltodextrin (Grain Processing Corp.) | 3.47 |
| Vanilla extract | 0.75 |
| Total | 100.00 |

The ingredients were mixed in a Sunbeam Mixmaster for one minute on medium-high speed. The resulting frosting, containing 6.8% fat, was found acceptable when organoleptically compared with a control frosting containing 20.2% fat.

EXAMPLE 13

| Chocolate Mousse | |
|---|---|
| Ingredients | Weight percent |
| Egg whites | 20.86 |
| Semisweet chocolate | 20.29 |
| Fat-gel emulsion prepared according to Example 6 | 16.27 |
| Water (#1) | 12.35 |
| Heavy cream | 11.18 |
| Egg yolks | 10.78 |
| Water (#2) | 3.53 |
| Mira Gel 463 starch (Staley Corp.) | 1.37 |
| Mira Thick 468 starch (Staley Corp.) | 1.37 |
| Nonfat milk solids | 1.00 |
| Vanilla extract | 1.00 |
| Total | 100.00 |

The chocolate and water (#2) were heated in a double boiler until the chocolate melted. The egg yolks were beaten slightly, a small amount of chocolate mixture was added and mixed in well, and the resulting mixture was added to the remaining chocolate-water mixture in the double boiler and cooked for 1.5 minutes with constant stirring. The mixture was removed from heat and the vanilla extract was added. Water (#1) was weighed into the blender. With the blender running at medium-high speed, the starches and nonfat milk solids were added slowly and blending was continued until the mixture was homogeneous. The fat-gel emulsion was added, blending was continued for about 30 seconds, and the resulting mixture was folded into the chocolate mixture. The heavy cream was whipped until soft peaks formed, then folded into the mixture. The egg whites were whipped until soft peaks formed and gently folded into the mixture until blended. The mixture was covered and refrigerated overnight. The resulting chocolate mousse, containing 15.1% fat, was found acceptable when compared organoleptically with a control chocolate mousse containing 23.3% fat.

EXAMPLE 14

| Vichyssoise | |
|---|---|
|  | Weight percent |
| Ingredients for soup base | |
| 5:1 mixture of leeks and onions | 32.74 |
| Peeled potatoes | 26.78 |
| Chicken broth | 38.69 |
| Butter | 1.79 |
| Total | 100.00 |
| Ingredients for finished soup | |
| Soup base | 75.00 |
| Fat-gel emulsion prepared according to Example 6 | 12.00 |
| Water | 12.00 |
| Mira Gel 463 starch (Staley Corp.) | 1.00 |
| Total | 100.00 |

The leeks were cleaned and trimmed. Leeks and onions were sliced thinly and sauteed for 15 minutes until golden in color. Peeled, sliced potatoes and chicken broth were added. The mixture was covered and simmered for 40 minutes with occasional stirring, pureed in a blender until smooth, and the resulting soup base was refrigerated until well chilled. The fat-gel emulsion and water were mixed in a blender at medium speed for 30 seconds, the starch was slowly added, and blending was continued for an additional 30 seconds. This mixture was blended with the chilled soup base for one minute in a mixer at low speed, and the mixture was refrigerated. The resulting vichyssoise, containing 4.5% fat, was found acceptable when compared organoleptically with a control containing 10.7% fat.

EXAMPLE 15

| Dip | |
|---|---|
| Ingredients | Weight percent |
| Fat-gel emulsion prepared according to Example 6 | 38.00 |
| Water | 27.00 |
| Sour cream | 20.00 |
| Lemon juice | 5.50 |
| Garlic herb blend | 3.50 |
| Nonfat milk solids | 3.00 |
| Mira Thick 468 starch (Staley Corp.) | 2.00 |
| Natural sour cream flavor R-7365/261917 (Haarmann and Reimer Corp.) | 0.50 |
| Artificial sour cream flavor 7-7038/261062 (Haarmann and Reimer Corp.) | 0.50 |
| Total | 100.00 |

In a blender running at medium speed, the starch, nonfat molk solids, and flavors were slowly added to the water during a period of about one minute. The fat-gel emulsion was added, and blending was continued for one minute. The mixture was transferred to a mixing bowl and mixed by hand with the sour cream and herb mix. The mixture was refrigerated for several hours. The resulting dip, containing 13.3% fat, was found acceptable when compared organoleptically with a control containing 18.2% fat.

EXAMPLE 16

| Sugar Cookie | |
|---|---|
| Ingredients | Weight percent |
| Fat-gel emulsion of Example 7 | 27.10 |
| Flour | 33.83 |
| Powdered sugar | 17.45 |
| Sugar | 13.56 |
| Eggs | 6.73 |
| Salt | 0.40 |
| Baking soda | 0.27 |
| Cream of Tartar | 0.21 |
| Vanilla extract | 0.45 |
| Total | 100.00 |

The sugar and the fat-gel emulsion were stirred in a Sunbeam Mixmaster at medium speed until a creamy batter was obtained. The eggs and vanilla extract were added, and stirring was continued until the batter was again homogeneous. The remaining ingredients were manually mixed, then slowly added to the batter while stirring at low speed, and stirring was continued until the resulting dough was homogeneous. The dough was refrigerated for at least three hours. Balls of the dough, 13 grams each, were scooped onto a coookie sheet, flattened to uniform height with a utensil which had been dipped in sugar, and baked for 10 minutes at 190° C. The resulting cookies, containing 8.5% fat, were found acceptable when compared organoleptically with a control cookie containing 27% fat.

EXAMPLE 17

Nonpourable Emulsion

Agar qel - Anhydrous Milkfat

An agar solution was prepared by dissolving 10.0 grams of food-grade agar in 990 grams of distilled water with stirring and heating to 95° C. The agar solution was cooled to about 60° C. and added with stirring to a hot (60° C.) solution of 16.6 grams of Dur-Em 117 emulsifier (Durkee Industrial Foods Corp. mono- and diglycerides) in 333 grams of molten anhydrous milkfat (Mid-America Farms). Stirring was continued for about 30 minutes while the mixture cooled to 25°-30° C. The resulting emulsion was stored in a refrigerator at approximately 5° C. for 24 hours prior to use.

EXAMPLE 18

Nonpourable Emulsion

Agar Gel - Partially Hydrogenated Soybean and Cottonseed Oil

An agar solution was prepared by dissolving 7.5 grams of food-grade agar in 1492 grams of distilled water with stirring and heating to 95° C. The agar solution was cooled to about 60° C., the pH was adjusted to about 3 with phosphoric acid, and the still-hot solution was added with stirring to a hot (60° C.) solution of 32.5 grams of Dur-Em 117 emulsifier (Durkee Industrial Foods Corp. mono- and diglycerides) in 750 grams of molten Tem Cote IE fat (Bunge Foods partially hydrogenated soybean and cottonseed oil). Stirring was continued for about 30 minutes while the mixture cooled to 25°-30° C. The resulting emulsion was passed through a two-stage homogenizer (2500 pounds per square inch followed by 500 pounds per square inch), then stored in a refrigerator at approximately 5° C. for 24 hours prior to use.

EXAMPLE 19

Nonpourable Emulsion

Carrageenan Gel - Partially Hydrogenated Soybean and Cottenseed Oil

A carrageenan solution was prepared by dissolving 15.0 grams of Gelcarin DG 764B carrageenan (Marine Colloids Division of FMC) in 1485 grams of distilled water in a blender at medium speed. The resulting solution was heated to 55°-60° C. and adjusted to a pH of about 3 with phosphoric acid, then added slowly with stirring to a hot (55°-60° C.) solution of 32.5 grams of Dur-Em 117 emulsifier (Durkee Industrial Foods Corp. mono- and diglycerides) in 750 grams of molten Tem Cote IE fat (Bunge Foods partially hydrogenated soybean and cottonseed oil). Stirring was continued for about 30 minutes while the mixture cooled to 25°-30° C. The resulting emulsion was passed through a two-stage homogenizer (2500 pounds per square inch followed by 500 pounds per square inch), then stored in a refrigerator at approximately 5° C. for 24 hours prior to use.

EXAMPLE 20

Nonpourable Emulsion

Agar Gel - Partially Hydrogenated Soybean Oil

An agar solution was prepared by dissolving 4.0 grams of food-grade agar in 296 grams of distilled water with stirring and heating to 95° C. The agar solution was cooled to about 60° C. and added with stirring to a hot (60° C.) solution of 7.1 grams of Dur-Em 117 emulsifier (Durkee Industrial Foods Corp. mono- and diglycerides) in 142 grams of molten Tem Plus 95 fat (Bunge Foods partially hydrogenated soybean oil). Stirring was continued for about 30 minutes while the mixture cooled to 25°-30° C. The resulting emulsion was stored in a refrigerator at approximately 5° C. for 24 hours prior to use.

EXAMPLE 21

Nonpourable Emulsion

Agar Gel - Partially Hydrogenated Soybean and Cottonseed Oil

An agar solution was prepared by dissolving 26.8 grams of food-grade agar in 1973 grams of distilled water with stirring and heating to 95° C. The agar solution was held at 95° C. for 30 minutes, then added without stirring to a hot (about 60° C.) solution of 50.0 grams of Dur-Em 117 emulsifier (Durkee Industrial Foods Corp. mono- and diglycerides) in 1000 grams of molten Kaomel fat (Durkee Industrial Foods Corp. partially hydrogenated soybean and cottonseed oil). The mixture was allowed to cool to about 75° C., held at this temperature for about 30 minutes, then allowed to cool to 30° C. while stirring. The emulsion was adjusted to pH 3.0 with phosphoric acid, then stored in a refrigerator at approximately 5° C. for 24 hours prior to use.

EXAMPLE 22

Frozen Dessert

| Frozen Dessert | |
|---|---|
| Ingredients | Weight percent |
| Fat-Gel emulsion of Example 17 | 12.0 |
| Sucrose | 15.0 |
| Powdered skim milk | 14.0 |
| Vanilla extract | 1.0 |
| Dricoid 200 (emulsifier-stabilizer manufactured by Kelco Division of Merck and Co., containing mono and diglycerides, guar gum, xanthan gum, carrageenan, and citric acid) | 0.2 |
| Water | 57.8 |
| Total | 100.0 |

The water was preheated to 60° C. and transferred to a kitchen blender. With the blender running at medium speed, the Dricoid 200 was added, blending was continued for 3 minutes, the powdered skim milk and sucrose were added, blending was continued for 3 minutes, the fat-gel emulsion was added, and blending was continued for 5 minutes. The resulting mixture was pasteurized by heating to 70° C. for 30 minutes, homogenized at 2500 pounds per square inch, cooled in an ice bath, and stored under refrigeration overnight. The vanilla extract was added with stirring, and the mixture was frozen with a small commercial ice cream freezer (Taylor Model 103). The resulting low-fat ice cream, containing 3% fat, was judged acceptable when compared organoleptically to a control ice cream containing 12% fat.

EXAMPLE 23

| Salad Dressing | | |
|---|---|---|
| Ingredients | Weight percent | |
| Deionized water | 50.85 | |
| M100 maltodextrin (Grain Processing Corp.) | 1.70 | A |
| Polysorbate 60 | 0.10 | A |
| Salt | 1.12 | A |
| Sugar | 1.99 | A |
| Propylene glycol alginate | 0.16 | B |
| Potassium sorbate | 0.10 | C |
| Sodium benzoate | 0.10 | C |
| Distilled white vinegar | 18.81 | D |
| Horseradish extract | 0.10 | D |
| Garlic Powder | 0.30 | |
| Mustard powder | 0.55 | |
| Onion powder | 0.30 | |
| Worchester powder | 0.07 | |
| Lemon Juice | 0.10 | |
| Xanthan gum | 0.40 | F |
| Fat-gel emulsion of Example 18 | 23.25 | |
| Total | 100.00 | |

The ingredients of group A were mixed in a blender at medium speed until a solution was obtained. With continued mixing at medium speed, the ingredients of groups B, C, D and E were added at one-minute intervals. Blending speed was increased, F was added during 2 minutes, blending was continued for 5 minutes, the fat-gel emulsion was added during 5 minutes, blending was continued for 5 minutes, and the mixture was homogenized at 1000 pounds per square inch. The resulting salad dressing, containing 7.6% fat, was found acceptable when compared organoleptically with a control salad dressing containing 46.5% fat.

EXAMPLE 24

Chocolate Chip Cookie

| Chocolate Chip Cookie | |
|---|---|
| Ingredients | Weight percent |
| Fat-gel emulsion of Example 19 | 17.75 |
| Semi-sweet chocolate morsels | 26.95 |
| Flour | 20.69 |
| Brown sugar | 12.60 |
| Sugar | 11.89 |
| Eggs | 9.01 |
| Salt | 0.47 |
| Baking soda | 0.32 |
| Vanilla extract | 0.32 |
| Total | 100.00 |

The sugar, brown sugar, fat-gel emulsion, and vanilla extract were stirred in a Sunbeam Mixmaster at medium speed until a creamy batter was obtained. The eggs were added, and stirring was continued until the batter was again homogeneous. The flour, salt, and baking soda were manually mixed, this mixture was slowly added to the batter while stirring at low speed, and stirring was continued until the batter was homogeneous. The chocolate morsels were added and manually mixed into the batter. Level teaspoons of the batter were transferred to a cookie sheet and baked for 7-8 minutes at 190° C. The resulting cookies, containing 23% fat, were found acceptable when compared organoleptically with a control cookie containing 31% fat.

EXAMPLE 25

Cookie Filling

| Ingredients | Weight percent |
| --- | --- |
| 10x powdered sugar | 32.50 |
| 6x powdered sugar | 32.15 |
| Fat-gel emulsion of Example 20 | 13.50 |
| Crisco shortening (Proctor and Gamble) | 5.00 |
| Polydextrose | 16.50 |
| Vanillin | 0.15 |
| Vanilla flavor | 0.10 |
| Salt | 0.10 |
| Total | 100.00 |

The fat-gel emulsion and shortening were blended in a Sunbeam Mixmaster until the mixture was homogeneous. Dry ingredients were mixed by hand, then slowly added with the mixer running at medium speed. Mixing was continued until the mixture was homogeneous. The resulting cookie filling, containing 9.3% fat, was found acceptable when compared organoleptically with a control cookie containing 27.5% fat.

EXAMPLE 26

Chocolate Pudding

| Ingredients | Weight percent |
| --- | --- |
| Skim milk | 50.75 |
| Buttermilk | 1.41 |
| Fat-gel emulsion of Example 21 | 8.00 |
| Water | 12.73 |
| 5 D.E. maltodextrin (Amaizo) | 5.48 |
| Cocoa powder | 1.90 |
| Salt | 0.15 |
| Sodium stearoyl-2-lactate | 0.20 |
| Freezist M modified tapioca starch (Staley Corp.) | 2.80 |
| Sodium bicarbonate | 0.08 |
| 10x powdered sugar | 16.00 |
| Vanilla extract | 0.50 |
| Total | 100.00 |

The maltodextrin, cocoa powder, salt, modified starch, sodium bicarbonate, and sugar were mixed by hand, then added while stirring to a mixture of the liquids: skim milk, buttermilk, water, and vanilla extract. The fat-gel emulsion and sodium stearoyl-2-lactate were added and mixed in thoroughly. The mixture was heated to 90° C. during about one hour, held at this temperature for 7 minutes, homogenized at 1000 psig while still hot, then refrigerated overnight. The resulting pudding, containing 3.4% fat, was found acceptable when compared organoleptically with a control pudding containing 8.8% fat.

EXAMPLE 27

Concentrated Emulsion with Agar Gel and Anhydrous Milkfat

An agar solution was prepared by dissolving 9.0 grams of food-grade agar in 141 grams of distilled water with stirring and heating to 95° C. After about 10 minutes, the agar solution was added with stirring to a hot (60° C.) solution of 30 grams of Dur-Em 117 emulsifier (Durkee Industrial Foods Corp. mono- and diglycerides) in 600 grams of anhydrous milkfat (Mid-America Farms). Stirring was continued for about 10 minutes while the mixture cooled to 25°-30° C. The resulting emulsion was stored in a refrigerator at approximately 5° C. for 24 hours prior to use.

EXAMPLE 28

Concentrated Emulsion with Agar Gel and Partially Hydrogenated Soybean-Cottonseed Oil An agar solution was prepared by dissolving 5.0 grams of food-grade agar in 230 grams of distilled water with stirring and heating to 95° C. After about 10 minutes, the agar solution was added with stirring to a hot (60° C.) solution of 25 grams of Dur-Em 117 emulsifier (Durkee Industrial Foods Corp. mono- and diglycerides) in 500 grams of Tem Cote IE fat (Bunge Foods partially hydrogenated sobyean and cottonseed oil). Stirring was continued for about 10 minutes while the mixture cooled to 25°-30° C. The resulting emulsion was stored in a refrigerator at approximately 5° C. for 24 hours prior to use.

EXAMPLE 29

Frozen Dessert

Preparation of fat substitute emulsion: One part by weight of concentrated emulsion prepared according to Example 27 was added to two parts by weight of hot water (80° C.) in a kitchen blender, and the mixture was blended for one minute at medium speed.

| Ingredients | Weight Percent |
| --- | --- |
| Fat substitute emulsion | 12.0 |
| Sucrose | 15.0 |
| Powdered skim milk | 14.0 |
| Vanilla extract | 1.0 |
| Dricoid 200 (emulsifier-stabilizer manufactured by Kelco Division of Merck and Co., containing mono and diglycerides, guar gum, xanthan gum, carrageenan, and citric acid) | 0.2 |
| Water | 57.8 |
| tr Total | 100.0 |

The water was preheated to 70° C. and transferred to a kitchen blender. With the blender running at medium speed, the Dricoid 200 was added, and blending was continued for 3 minutes. The powdered skim milk and sucrose were added, and blending was continued for 3 minutes. The fat substituted emulsion was added, and blending was continued for 5 minutes. The resulting mixture was pasteurized by heating to 70° C. for 30 minutes, homogenized at 2500 pounds per square inch, homogenized again at 500 pounds per square inch, cooled rapidly in an ice bath, and stored under refrigeration overnight. The vanilla extract was added with stirring, and the mixture was frozen with a small commercial ice cream freezer (Taylor Model 103). The resulting low-fat ice cream, containing 3% fat, was judged by a taste panel to be equivalent in overall organoleptic quality to a standard ice cream containing 13% fat.

EXAMPLE 30

Salad Dressing

Preparation of fat substitute emulsion: Concentrated emulsion prepared according to Example 28 was mixed with an equal weight of hot (50° C.) water for 15 minutes in a kitchen blender at medium speed, then allowed to cool to room temperature.

| Ingredients | Weight percent | |
|---|---|---|
| Deionized water | 53.96 | A |
| Vinegar | 15.39 | |
| Maltodextrin M-100 | 1.70 | B |
| Salt | 1.12 | |
| Sugar | 1.99 | |
| Mustard powder | 0.56 | |
| Potassium sorbate | 0.10 | |
| Sodium benzoate | 0.10 | |
| Garlic powder | 0.30 | |
| Onion powder | 0.30 | |
| Worchester powder | 0.07 | |
| Polysorbate 60 | 0.10 | C |
| Horseradish extract | 0.10 | |
| Lemon Juice | 0.10 | |
| Xanthan gum | 0.70 | D |
| Propylene glycol alginate | 0.16 | |
| Fat substitute emulsion | 23.25 | E |
| Total | 100.00 | |

The ingredients of group A were mixed in a bucket. With rapid stirring, sufficient to maintain a strong vortex, the ingredients of group B were added, mixing was continued for one minute, the ingredients of group C were added, and mixing was continued for one minute. In a separate container, the ingredients of group D were mixed by hand stirring with a portion of the fat substitute emulsion (35%). This mixture was then added to the other ingredients in the bucket, and the stirring rate was gradually increased during a 10 minute period. With continued stirring, the remainder of the fat substitute emulsion was added during 6 minutes, and stirring was continued for 2 minutes. The emulsion was then homogenized at 2000 pounds per square inch. The resulting salad dressing, containing 7.6% fat, was found acceptable when compared organoleptically with a control salad dressing containing 46.5% fat.

EXAMPLE 31

Nonpourable Emulsion with Agar Gel, Partially Hydrogenated Soybean/Palm Oil, and Polydextrose Water-Binding Agent An agar solution was prepared by dissolving 4.0 grams of food-grade agar in 296 grams of distilled water with stirring and heating to 95° C. After the agar solution had cooled to about 70° C., 550 grams of polydextrose was added with stirring. The resulting solution was added with stirring to a hot (60° C.) solution of 7.1 grams of Dur-Em 117 emulsifier (Durkee Industrial Foods Corp. mono- and diglycerides) in 142 grams of Crisco shortening (Proctor and Gamble partially hydrogenated soybean and palm oils). Stirring was continued while the mixture cooled to 25°-30° C. The resulting emulsion was stored in a refrigerator at approximately 5° C. for 24 hours prior to use.

EXAMPLE 32

| Cookie Filling | |
|---|---|
| Ingredients | Weight percent |
| 10x powdered sugar | 32.33 |
| 6x powdered sugar | 32.32 |
| Fat-gel emulsion of Example 31 | 30.00 |
| Crisco shortening (Proctor and Gamble) | 5.00 |
| Vanillin | 0.15 |
| Vanilla flavor | 0.10 |

| -continued | |
|---|---|
| Cookie Filling | |
| Ingredients | Weight percent |
| Salt | 0.10 |
| Total | 100.00 |

The fat-gel emulsion and shortening were blended in a Sumbeam Mixmaster until the mixture was homogeneous. Dry ingredients were mixed by hand, then slowly added with the mixer running at medium speed. Mixing was continued until the mixture was homogeneous. The resulting cookie filling, containing 9.3% fat, was found acceptable when compared organoleptically with a control cookie containnig 27.5% fat.

I claim:

1. A two phase emulsion useful as a low calorie fat substitute comprising:
   (a) from about 1 to about 95 pecent of a single aqueous phase rendered non-flowable by the addition of an effective amount of a gel-forming composition, and
   (b) from about 5 to about 99 percent of an oil phase comprising a solid or semi-solid fat or oil and an emulsifier wherein the interaction between said non-flowable aqueous phase and said oil phase results in said two phase emulsion being pourable.

2. The emulsion according to claim 1 wherein said aqueous phase is present at a concentration of from about 50 to about 85 percent and said fat or oil is present at a concentration of from about 15 to about 50 percent, based on the weight of the total emulsion.

3. The emulsion according to claim 1 wherein said gel-forming composition is selected from the group consisting of agar, gelatin, pectins, and carrageenans.

4. The emulsion according to claim 1 wherein said gel-forming composition comprises:
   (a) a composition selected from the group consisting of alginates, xanthans, carrageenans, succinoglycans, and scleroglucans; and
   (b) an appropriate cross-linking agent.

5. The emulsion according to claim 4 wherein said composition is carrageenan and said cross-linking agent is selected from the group consisting of calcium or potassium salts; or combinations thereof.

6. The emulsion according to claim 1 wherein said gel-forming composition is xanthan gum combined with locust bean gum or guar gum; or combinations thereof.

7. The emulsion of claim 1 wherein said gel-forming composition is present at a concentration of from about 0.1 to about 3.0 percent of the aqueous phase.

8. The emulsion of claim 7, wherein said gel-forming composition is agar, and is present at a concentration of from about 0.3 to about 0.7 percent of the aqueous phase.

9. The emulsion of claim 1 wherein said gel-forming composition is alginate cross-linked with a calcium salt, and said cross-linked alginate is present at a concentration of from about 0.5 to about 1.5 percent of the aqueous phase.

10. The emulsion of claim 1 wherein said gel-forming composition is carrageenan, and is present at a concentration of from about 0.7 to about 2.0 percent of the aqueous phase.

11. The emulsion of claim 1 wherein said gel-forming composition is carrageenan cross-linked with a potassium or calcium salt, and said cross-linked carrageenan is present at a concentration of from about 0.3 to about 1.5 percent of the aqueous phase.

12. The emulsion according to claim 1 whrein said gel forming composition is alginate acidified with an effective amount of an acidifying agent.

13. The emulsion according to claim 1 wherein said emulsifier is selected from the group consisting of lecithins, monoglycerides, diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, or citric with fatty acids or fatty alcohols, esters of acids selected from the group consisting of fumaric, lactic, tartaric, citric, acetic, or succinic with mono- or diglycerides; and combinations thereof.

14. The emulsion according to claim 13 wherein said emulsifier is selected from the group consisting for mono- and diglycerides; and combinations thereof.

15. The emulsion according to claim 1 wherein said edible fat or oil is selected from the group consisting of vegetable fats and oils, animal fats, anhydrous milkfat, hydrogenated vegetable oils, partially hydrogenated vegetable oils, partially hydrogenated palm kernel oil; and combinations thereof.

16. The emulsion according to claim 15 wherein said fat or oil is selected from the group consisting of partially hydrogenated palm kernel oil, partially hydrogenated vegetable oils, and anhydrous milkfat; and combinations thereof.

17. The emulsion according to claim 1 further comprising the addition of at least one suitable pH adjusting agent.

18. The emulsion according to claim 17 wherein said pH adjusting agent is selected from the group consisting of acids selected from the group consisting of phosphoric, acetic, lactic, fumaric, adipic, malic, tartaric, citric, hydrochloric and sulfuric acids; salts thereof; glucono delta lactone; and combinations thereof.

19. A process for preparing a pourable emulsion comprising:
(a) mixing an aqueous medium, an effective amount of a gel-forming composition to render said aqueous phase non-flowable, a fat or oil and an appropriate emulsifier;
(b) stirring at a temprature and shear rate sufficient to produce an emulsion of the fat or oil with the aqueous medium; and
(c) stirring as said emulsion is cooled to a temperature of from about 5° C. to about 30° C.

20. The process according to claim 19.wherein said gel-forming composition is selected from the group consisting of agar, gelatin, pectins and carrageenans.

21. The process according to claim 19 wherein said gel-forming composition comprises:
(a) a composition selected from the group consisting of alginates and carrageenans; and
(b) an appropriate cross-linking agent.

22. The process according to claim 21 wherein said composition is alginate and said cross-linking agent is a calcium salt.

23. The process according to claim 21 wherein said composition is carrageenan and said cross-linking agent is selected from the group consisting of calcium or potassium salts; or combinations, thereof.

24. The process of claim 19 wherein said gel-forming composition is xanthan gum combined with locust bean gum or guar gum; or combinations thereof.

25. The process of claim 19 wherein said gel-forming composition is present at a concentration of from about 0.1 to about 3.0 percent of the aqueous phase.

26. The process of claim 25 wherein said gel-forming composition is agar, and is present at a concentration of from about 0.3 to about 0.7 percent of the aqueous phase.

27. The process of claim 19 wherein said gel-forming composition is alginate cross-linked with a calcium salt, and said cross-linked alginate is present at a concentration of from about 0.5 to about 1.5 percent of the aqueous phase.

28. The process of claim 19 wherein said gel-forming composition is carrageenan, and is present at a concentration of from about 0.7 to about 2.0 percent of the aqueous phase.

29. The process of claim 19 wherein said gel-forming composition is carrageenan cross-linked with a potassium or calcium salt, and said cross-linked carrageenan is present at a concentration of from about 0.3 to about 1.5 percent of the aqueous phase.

30. The process according to claim 19 wherein said emulsifier is selected from the group consisting of lecithins, monoglycerides, diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, or citric with fatty acids or fatty alcohols, esters of acids selected from the group consisting of fumaric, lactic, tartaric, citric, acetic, or succinic with mono- or diglycerides; and combinations thereof.

31. The process according to claim 30 wherein said emulsifier is selected from the group consisting of mono- and diglycerides; and combinations thereof.

32. The process according to claim 19 wherein said edible fat or oil is selected from the group consisting of vegetable fats and oils, animal fats, anhydrous milkfat, hydrogenated vegetable oils, partially hydrogenated vegetable oils, partially hydrogenated palm kernel oil; and combinations thereof.

33. The process according to claim 32 wherein said fat or oil is selected from the group consisting of partially hydrogenated palm kernel oil, partially hydrogenated vegetable oils, and anhydrous milkfat; and combinations thereof.

34. The process according to claim 19 further comprising the addition of at least one suitable pH adjusting agent.

35. The process according to claim 34 wherein said pH adjusting agent is selected from the group consisting of acids selected from the group consisting of phosphoric, acetic, lactic, fumaric, malic, adipic, tartaric, citric, hydrochloric, and sulfuric acids; salts thereof; glucono delta lactone; and combinations thereof.

36. A triglyceride containing foodstuff having at least a portion of the normally present triglyceride replaced by the emulsion of claim 1.

37. A frozen dessert containing the emulsion of claim 1.

38. A salad dressing containing the emulsion of claim 1.

39. A dip for crakers, chips or vegetables containing the emulsion of claim 1.

40. A spread containing the emulsion of claim 1.

41. A confection having at least a portion of the normally present triglyceride replaced by the emulsion of claim 1.

42. A whipped topping containing the emulsion of claim 1.

43. A frosting or icing for cakes and cookies containing the emulsion of claim 1.

44. A filling for cakes or cookies containing the emulsion of claim 1.

45. A whipped dessert, gelled dessert, or pudding containing the emulsion of claim 1.

46. A beverage containing the emjulsion of claim 1.

47. A soup containing the emulsion of claim 1.

48. Baked goods containing the emulsion of claim 1.

49. A triglyceride-containing foodstuff having at least a portion of the normally present triglyceride replaced by a two-phase emulsion, said two-phase emulsion comprising:
  (a) from about 1 to about 95 percent of an aqueous phase rendered non-flowable by the addition of an effective amount of a gel-forming composition; and
  (b) from about 5 to about 99 percent of an oil phase comprising a fat or oil and an emulsifier; said emulsion processed to render said emulsion non-pourable.

50. A foodstuff according to claim 49 in the form of a frozen desert.

51. A foodstuff according to claim 49 in the form of a salad dressing.

52. A foodstuff according to claim 49 in the form of a dip for crackers, chips or vegetables.

53. A foodstuff according to claim 49 in the form of a spread.

54. A foodstuff according to claim 49 in the form of whipped topping.

55. A triglyceride containing foodstuff having at least a portion of the normally present triglyceride replaced by an emulsion according to claim 49, wherein said foodstuff is in the form of a confection.

56. A foodstuff according to claim 49 in the form of frosting or icing for cakes and cookies.

57. A foodstuff according to claim 49 in the form of a filling for cakes or cookies.

58. A foodstuff according to claim 49 in the form of a whipped dessert, gelled dessert, or pudding.

59. A foodstuff according to claim 49 in the form of a beverage.

60. A foodstuff according to claim 49 in the form of a soup.

61. A foodstuff according to claim 49 in the form of baked goods.

62. A method of reducing the fat content of a food containing triglycerides comprising replacing at least a portion of the normally present triglyceride with a two-phase emulsion comprising:
  (a) from about 1 to about 95% of an aqueous phase rendered non-flowable by the addition of a suitable amount of a gel-forming composition; and
  (b) from about 5 to about 99 percent of an oil phase comprising a fat or oil and an emulsifier; said emulsion processed to render said emulsion nonpourable.

63. A method according to claim 62 wherein said food is selected from the group consisting of frozen desserts, salad dressings, dips for chips, crackers or vegetables, spreads, confections, whipped toppings, frostings or icings for cakes or cookies, fillings for cakes or cookies, whipped desserts, gelled desserts, puddings, beverages, soups and baked goods.

64. A method of reducing the fat content of a food containing triglycerides comprising replacing at least a portion of the normally present triglyceride with an emulsion of claim 1.

65. A method according to claim 64 wherein said food is selected from the group consisting of frozen desserts, salad dressings, dips for chips, crackers or vegetables, spreads, confections, whipped toppings, frostings or icings for cakes or cookies, fillings for cakes or cookies, whipped desserts, gelled desserts, puddings, beverages, soups and baked goods.

* * * * *